A. SEYMOUR.
Tree-Protector.
No. 45,087.
Patented Nov. 15, 1864.
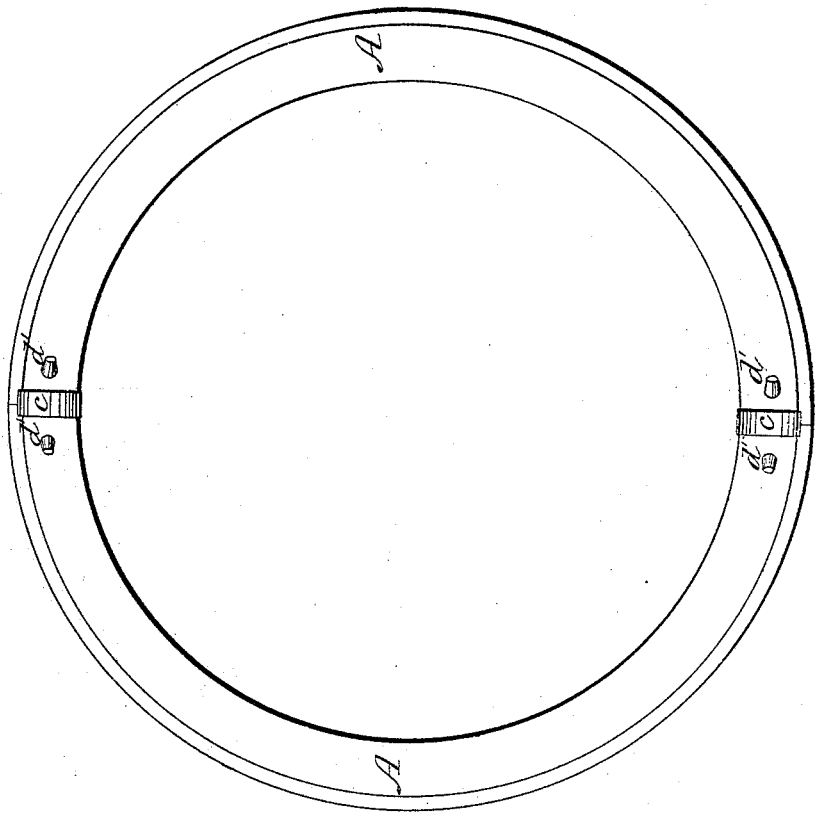
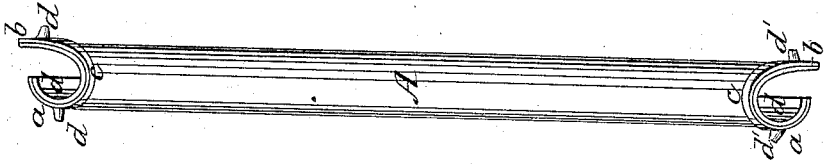
Witnesses.
Wm Thompson
Jeremy W Bliss
Inventor
Albert Seymour
by his Attorney
Jeremy W Bliss

UNITED STATES PATENT OFFICE.

ALBERT SEYMOUR, OF HARTFORD, CONNECTICUT.

IMPROVED TREE-PROTECTOR.

Specification forming part of Letters Patent No. 45,087, dated November 15, 1864.

*To all whom it may concern:*

Be it known that I, ALBERT SEYMOUR, of Hartford, county of Hartford, and State of Connecticut, have invented certain new and useful Improvements in Tree-Belts for Protecting them from Insects; and I do hereby declare that the same is described and represented in the following specification and drawings; and to enable others skilled in the art to make and use the same, I will proceed to describe its construction by referring to the drawings, in which the same letters indicate like parts in each of the figures.

The nature of this improvement will be fully understood from the specification and drawings, in which—

Figure 1 is a top view. Fig. 2 is a sectional end view, showing the ends of the sections, whether made in two or more pieces.

It consists of a cast-metal trough made in two or more parts, having the ends thereof enlarged, so as to receive the ends of the corresponding parts, and in putting them together I use a sealing substance, so as to form a tight joint, and then secure them together by means of a clasp or wires, &c., tied or wound around the prongs $d'$, formed on each side of the ends of the component parts.

A A show a circular ring or tree-belt made in two parts. $a$ is the under side or trough. $b$ is the upper side, which curves over and juts outward over the trough for the purpose of keeping out water, &c. $c$ is the enlarged portion at the ends, made so as to receive the ends of another piece (made without the enlarged portion) flush, or nearly so, with the inside of the trough. I also make them with a partition, $d$, at each end of each piece to secure all possible leakage in or through the cemented joint. $d'$ are prongs cast or made on the upper and under sides near the ends for the purpose of tying or wiring the parts together when in their proper place around the body of a tree. Between the inside diameter of this belt and the body of a tree I stuff straw, hay, or other suitable material, so as to effectually stop the passage of the insect upward, except over the outside of this belt. After having cemented the joints and tied them securely together, and packed the opening between the inside circle of the belt and the body of the tree, I place within the trough a compound or liquid of some sufficient destructive quality, which will effectually prevent their farther progress upward into the branches of the trees.

Having thus shown and described the construction and how it is applied to the tree, it seems superfluous to enter into any further explanation, as a person skilled in the art will be fully able to make and use therefrom.

I claim—

As a new improved article of manufacture, a tree-protector, each section of which being made in one piece of cast metal, with a trough, $a$, sheave $b$, partitions $d$, and prongs $d'$, substantially as shown and described.

ALBERT SEYMOUR. [L. S.]

Witnesses:
   WM. THOMPSON,
   JEREMY W. BLISS.